(12) United States Patent
Barton

(10) Patent No.: US 6,759,763 B2
(45) Date of Patent: Jul. 6, 2004

(54) APPARATUS FOR CONTROLLING POWER DISTRIBUTION TO DEVICES

(75) Inventor: Bruce Barton, Huntington, NY (US)

(73) Assignee: Bits LTD

( * ) Notice: Subject to any disclaimer, the term of this patent is extended or adjusted under 35 U.S.C. 154(b) by 233 days.

(21) Appl. No.: 10/143,221

(22) Filed: May 10, 2002

(65) Prior Publication Data

US 2003/0209944 A1 Nov. 13, 2003

(51) Int. Cl.[7] .................................................. H02J 1/00
(52) U.S. Cl. ...................................................... 307/39
(58) Field of Search ............................. 307/38, 39, 41, 307/113, 115, 116, 125, 126, 130, 131, 154, 155

(56) References Cited

U.S. PATENT DOCUMENTS

| 4,731,549 | A | * | 3/1988 | Hiddleson | 307/125 |
| 4,825,140 | A | * | 4/1989 | St. Louis | 323/237 |
| 4,970,623 | A | * | 11/1990 | Pintar | 361/187 |
| 5,541,457 | A | * | 7/1996 | Morrow | 307/38 |
| 5,565,714 | A | * | 10/1996 | Cunningham | 307/112 |
| 5,923,103 | A | * | 7/1999 | Pulizzi et al. | 307/126 |
| 6,501,195 | B1 | * | 12/2002 | Barton | 307/125 |
| 6,528,902 | B1 | * | 3/2003 | Barton | 307/39 |

* cited by examiner

*Primary Examiner*—Matthew V. Nguyen
(74) *Attorney, Agent, or Firm*—I. Zborovsky

(57) ABSTRACT

An apparatus for controlling a power distribution to devices has a power inlet to be connected to a power source, a primary power outlet to be connected to a primary device, at least one secondary power outlet to be connected to at least one secondary device, a sensing unit for sensing when a current level falls below a threshold in response to the primary device being turned off and when the current level raises above a threshold in response to the primary device being turned on, an executing unit for interrupting a power supply to the at least one secondary power outlet when the sensing unit senses the currents level below the threshold and supplying power to the at least one secondary power outlet when the sensing unit senses the current level above the threshold correspondingly, and a unit for setting the threshold for interrupting a power supply lower than the threshold for supplying power to the at least one secondary outlet.

5 Claims, 5 Drawing Sheets

APPARATUS FOR CONTROLLING POWER DISTRIBUTION TO DEVICES

BACKGROUND OF THE INVENTION

The present invention relates to an apparatus for controlling power distribution to devices, for example outlet strips, etc.

Outlet strips provide multiple outlets for one single outlet. Outlet strips are used in a variety of common places and businesses and households. Due to their wide use of applications, manufacturers are now producing specialized outlet strips. Some of these specialized outlet strips switch the power on and off to some of their outlets depending upon the current draw of one of the unswitched (control) outlets. When the current at the control outlet exceeds a preset threshold the switched outlets turn on. When the current draw falls below the same threshold, the switched outlets turn off. This can be accomplished by several different methods. If the device plugged into the control outlet draws more or less current than the threshold, this type of outlet strips works fine. However, when the device draws the same amount of current as the threshold, the outlet strip could oscillate the switched outlets. This would cause the device on the switched outlets to be turned on and off many times in a row and could cause damage to the devices. Some solutions related to the outlet strips are disclosed in U.S. patent application Ser. Nos. 09/521,029; 09/553,355; 09/953,743; U.S. Pat. No. 4,825,140.

SUMMARY OF THE INVENTION

Accordingly, it is an object of the present invention to provide an apparatus for controlling power distribution to the devices, which avoids the disadvantages of the prior art.

In keeping with these objects and with others which will become apparent hereinafter, one feature of the present invention resides, briefly stated, in an apparatus for controlling power distribution to the devices which has a power inlet to be connected to a power source; a primary power outlet to be connected to a primary device; at least one secondary power outlet to be connected to at least one secondary device; a primary power outlet to be connected to a primary device; at least one secondary power outlet to be connected to at least one secondary device; sensing means for sensing when a current level falls below a threshold in response to the primary device being turned off and when the current level raises above a threshold in response to the primary device being turned on; executing means operatively connected with said sensing means and operative for interrupting a power supply to said at least one secondary power outlet when said sensing means sends the currents level below the threshold and supplying power to said at least one secondary power outlet when said sensing means senses the current level above the threshold correspondingly; and means for setting the threshold for interrupting a power supply to said at least one secondary power outlet in response to the primary device being turned off lower than the threshold for supplying power to said at least one secondary outlet in response to the primary device being turned on.

When the apparatus is designed in accordance with the present invention, the on/off threshold would change into separate on threshold and off threshold. The switched outlets would turn on using a higher threshold than the turn off threshold. This type of arrangement which is based on hysteresis eliminates the possibility of relay chatter and/or oscillations due to current draw.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
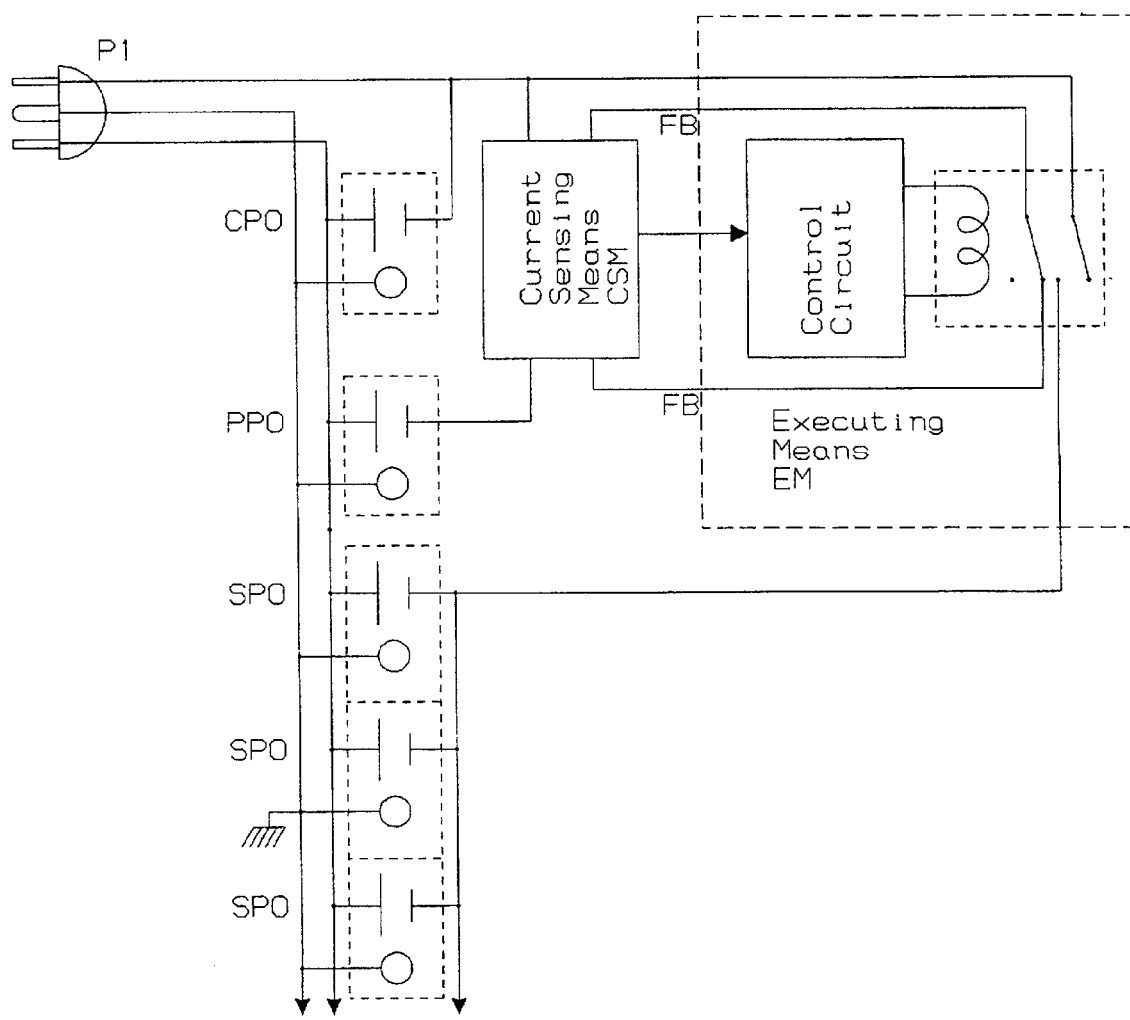
FIG. 1 is a view showing an apparatus for controlling power distribution to the device in accordance with the first embodiment of the invention.

An apparatus for distributing power to devices, which is formed for example as a power strip is shown in accordance with the first embodiment of the present invention in FIG. 1. In has a power inlet P1 which can be provided with a surge protection SP and a circuit breaker CB1 and is connectable to an AC power source. A primary power outlet is identified as PPO and is provided for connecting a primary device, for example a computer. At least one, preferably a plurality of secondary power outlets are identified with reference SPO and provided for connection of secondary devices, for example computer associated accessories. A constant power outlet which is identified as CPO is used for connecting a device which must always have power and does not affect or is not affected by the other devices.

The apparatus further has current sensing means for sensing a current level identified as CSM. In particular, the current sensing means senses when a current level falls below or raises above a threshold. In particular, the current sensing means senses when a current level falls below a threshold in response to the primary device connected to the primary power outlet PPO being turned off, and when the current level raises above a threshold in response to the primary device connected to the primary power outlet PPO being turned on. The sensing means can include a resistor, a current sensing coil, etc., as disclosed for example in our patent application Ser. Nos. 09/521,029; 09/553,355; 09/953,743 which are incorporated here by reference.

The apparatus further has executing means EM, which can be formed for example as a relay with a control circuit. The control circuit measures the output of the sensing means to determine whether it crossed the threshold or not, and depending on the result triggers or does not trigger the relay. When the primary device is turned on, the control circuit turns on the relay and the relay provides power supply to the secondary power outlets for secondary devices. When however the primary device is turned off, the control circuit turns off the relay and the relay removes power from the secondary power outlets and therefore from the secondary devices connected to the latter.

In accordance with the present invention, means is provided for setting the threshold for interrupting a power supply to the secondary power outlets in response to the primary device being turned off lower than the threshold for supplying power to the secondary power outlets in response to the primary device being turned on. The threshold setting means is formed in the embodiment shown in FIG. 1 by a feedback FB from the relay to the current sensing means. Depending on whether the relay is on or off, a signal from the relay is supplied to the current sensing means, so that depending on the condition of the relay or in other words depending on whether the primary device is turned off or turned on, the output voltage of the sensing means is changed, so as to correspondingly change the threshold for interrupting a power supply to the secondary power outlets in response to the primary device being turned off lower than the threshold for supplying power to the secondary power outlets in response to the primary device being turned on. The feedback FB from the relay to the current sensing means in fact forms a hysteresis means for the above mentioned two different the thresholds.

Figure 2:
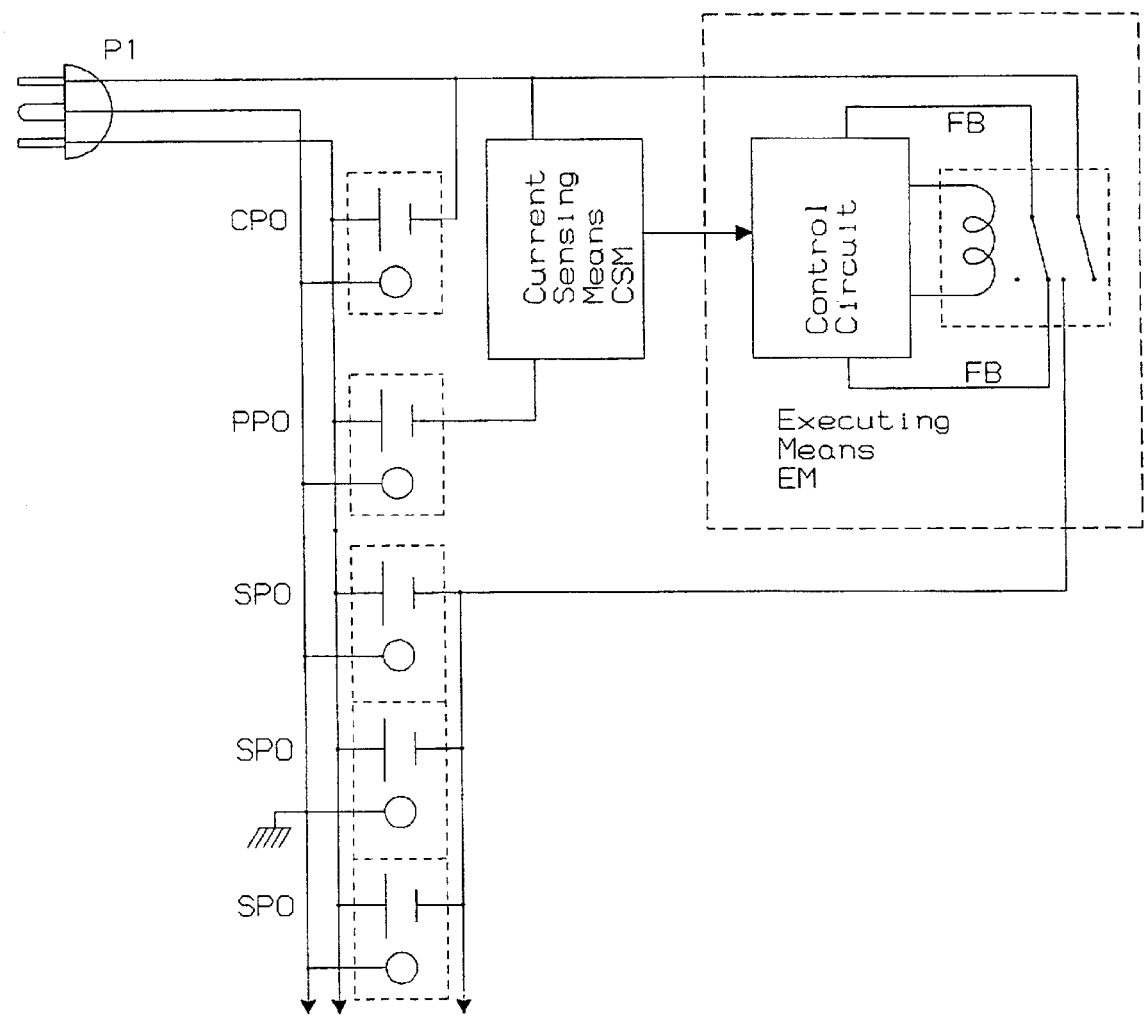
FIG. 2 is a view showing an apparatus for controlling power distribution to the device in accordance with the second embodiment of the invention.

The apparatus shown in FIG. 2 substantially corresponds to the apparatus shown in FIG. 1. However the hysteresis means in this embodiment is formed differently. Here the hysteresis means is formed as a feedback FB from the relay to the control circuit of the executing means. The feedback FB from the relay to the control circuit of the executing means is formed so that the thresholds of the executing means changes depending on whether the primary device is turned off or turned on. With this feedback FB the threshold is changed depending on the condition of the relay or in other words depending on whether the primary device is turned off or turned on.

Figure 3:
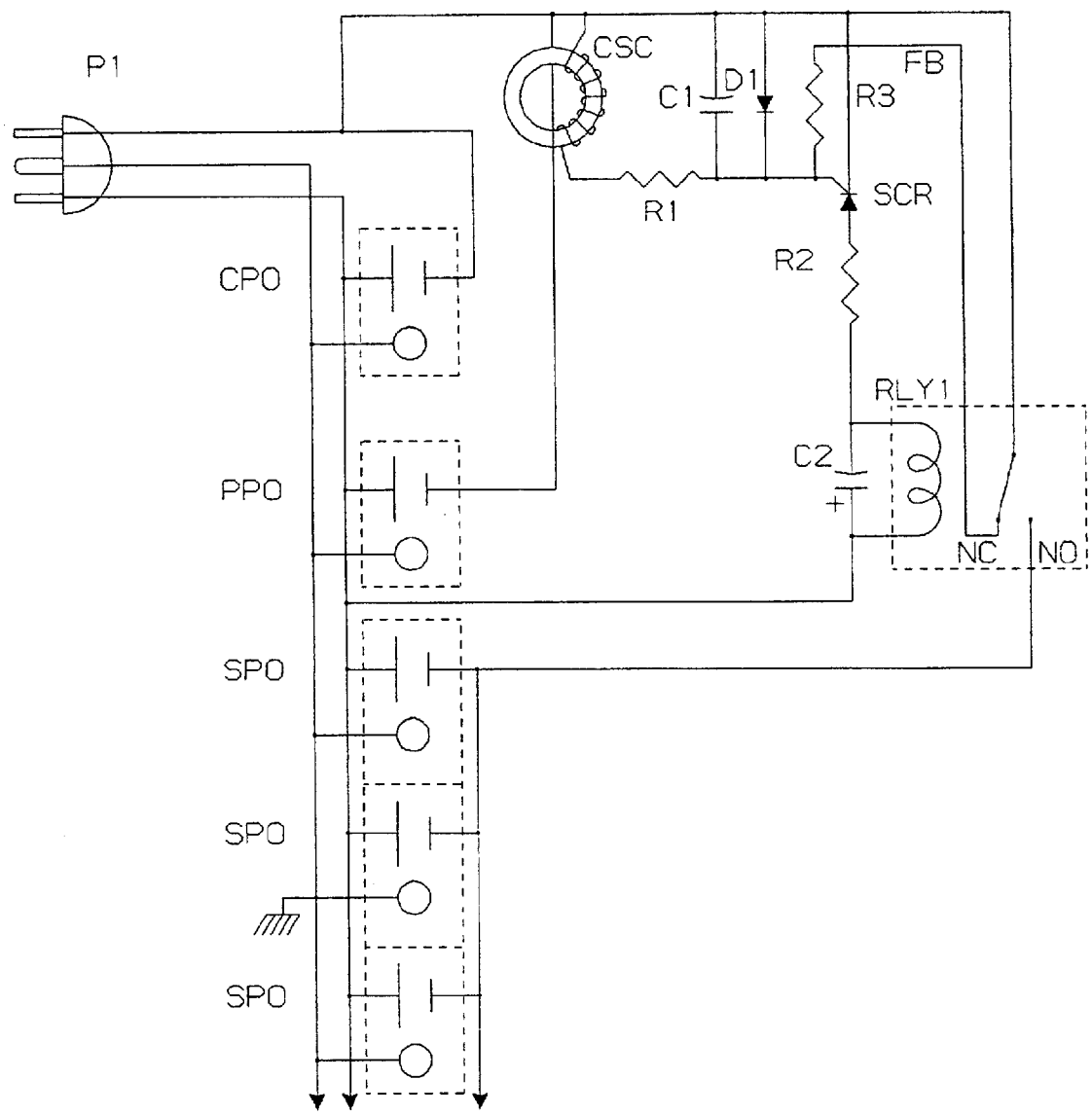
FIG. 3 is a view showing an apparatus for controlling power distribution to the device in accordance with the third embodiment of the invention.

The apparatus in accordance with FIG. 3 shows a further embodiment of the present invention in more detail. Here the current sensing means is formed as a current sensing coil CSC which converts a current into voltage, the executing means includes a relay 1 and the control circuit includes SCR which controls the relay. The apparatus further has a voltage divider between the current sensing coil CSC and the SCR formed by resistances R1 and R3. In this embodiment the feedback FB extends from the relay to the voltage divider, in particular to the resistor R3. Depending on the condition of the relay RLY1, the feedback FB changes the output of the voltage divider R1, R3 going to the relay. Therefore, the threshold is changed correspondingly.

Figure 4:
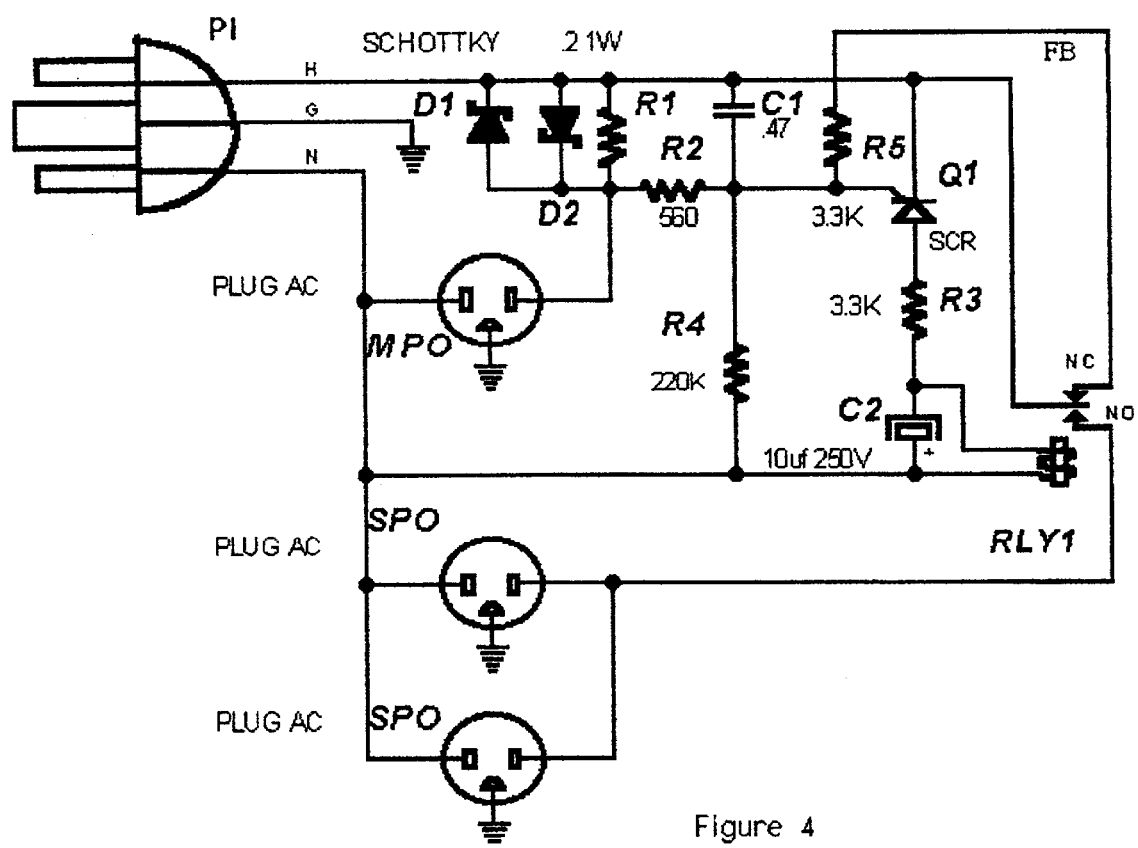
FIG. 4 is a view showing an apparatus for controlling power distribution to the device in accordance with the fourth embodiment of the invention.

In the apparatus shown in the embodiment of FIG. 4, the sensing means include a resistor R1 provided with oppositely connected diodes D1 and D2 for limiting voltage across the resistor R1. The executing means have a relay 1 and its control circuit includes an SCR with a voltage divider including R2, R4, R5. The resistor R3 limits the current of the relay. The voltage divider R2, R4, R5 provides an increase of voltage so as to guarantee triggering of the SCR. The hysteresis means of this embodiment include a feedback FB which extends from the relay RLY1 to the voltage divider R2, R4, R5, so that, depending on the condition of the relay, the output of the voltage divider changes and therefore the threshold varies as described herein above to provide different thresholds when the primary device is turned off and on.

Figure 5:
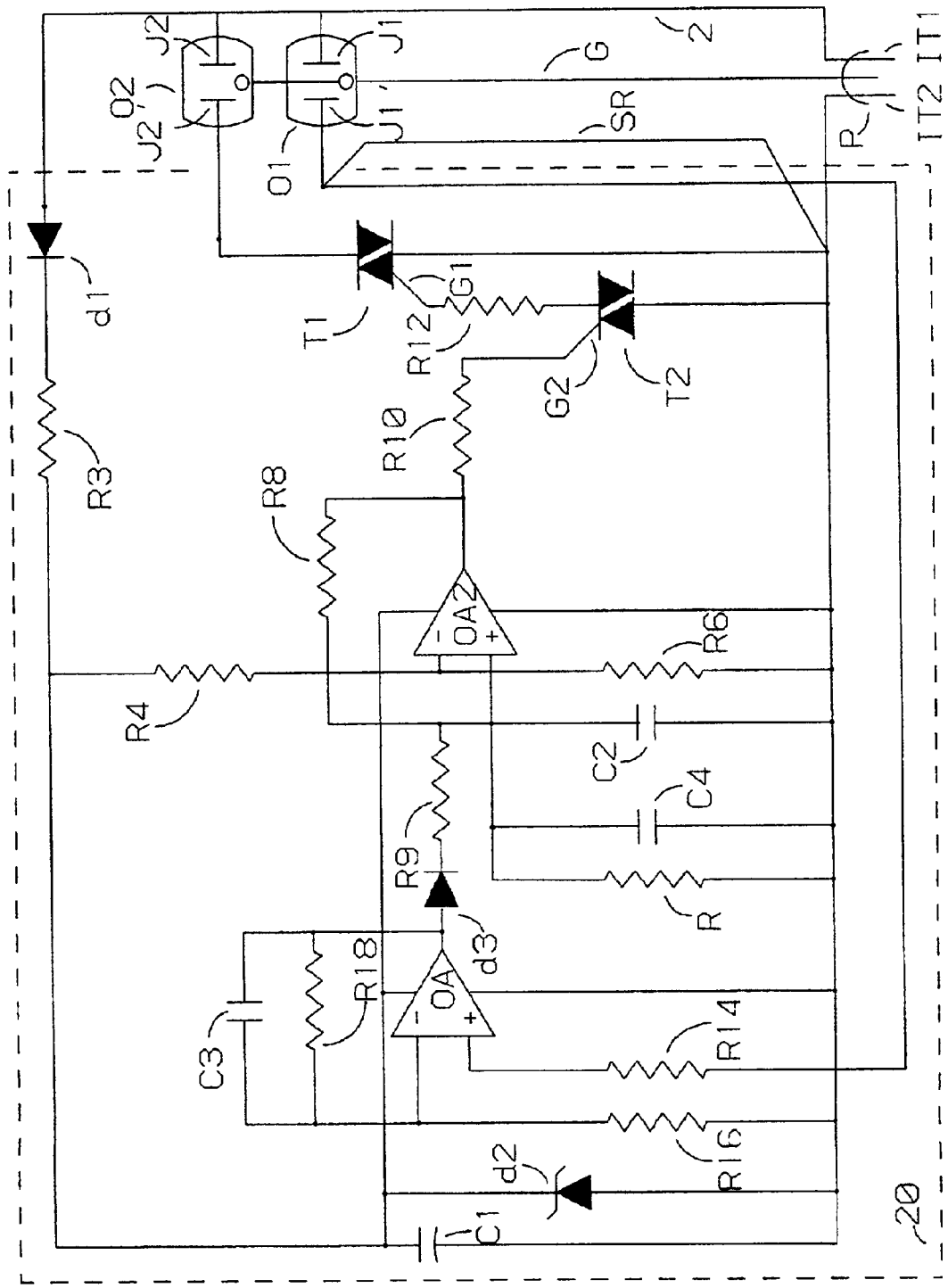
FIG. 5 is a view showing an apparatus for controlling power distribution to the device in accordance with the fifth embodiment of the invention.

In the embodiment of FIG. 5 the current sensing means include a sensing resistor SR, an operational amplifier OA, a rectifier D3 and gain controlling resistors R14, R16, R18. The executing means include a relay formed by a triacs T1 and T2 with a control circuit including an operation amplifier OA2. In this embodiment the hysteresis means include a feedback R8 extending from an output of the control circuit to the input of the control circuit. The feedback represented by the resistor R8 feeds a small voltage back depending on the condition and therefore varies the output of the sensing means, actually depending on the whether the primary device is turned on or turned off.

It will be understood that each of the elements described above, or two or more together, may also find a useful application in other types of constructions differing from the types described above.

While the invention has been illustrated and described as embodied in apparatus for controlling power distribution to devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An apparatus for controlling a power distribution to devices, comprising a power inlet to be connected to a power source; a primary power outlet to be connected to a primary device; at least one secondary power outlet to be connected to at least one secondary device; sensing means for sensing when a current level falls below a threshold in response to the primary device being turned off and when the current level raises above a threshold in response to the primary device being turned on; executing means operatively connected with said sensing means and operative for interrupting a power supply to said at least one secondary power outlet when said sensing means senses the currents level below the threshold and supplying power to said at least one secondary power outlet when said sensing means senses the current level above the threshold correspondingly; and means for setting the threshold for interrupting a power supply to said at least one secondary power outlet in response to the primary device being turned off lower than the threshold for supplying power to said at least one secondary outlet in response to the primary device being turned on.

2. An apparatus as defined in claim 1, wherein said threshold setting means is formed as current hysteresis means.

3. An apparatus as defined in claim 2, wherein said current hysteresis means is connected to said sensing means and operative for providing from said sensing means different voltages to said executing means depending on whether the primary device is turned off or turned on.

4. An apparatus as defined in claim 2, wherein said current hysteresis means is connected to said executing means and operative for varying the threshold of said executing means depending on whether the primary device is turned on or turned off.

5. An apparatus as defined in claim 2, wherein said current hysteresis means is connected to control means of said executing means and operative for varying an output of said sensing means depending on whether the primary device is turned on or turned off.

* * * * *